US012715265B2

(12) United States Patent
Swanson et al.

(10) Patent No.: US 12,715,265 B2
(45) Date of Patent: Aug. 25, 2026

(54) METHOD FOR CONTROLLING A CONDUCTIVE OR CONVECTIVE EFFECTOR

(71) Applicant: GENTHERM INCORPORATED, Novi, MI (US)

(72) Inventors: Jeremy Swanson, Ypsilanti, MI (US); Tyler Myers, Plymouth, MI (US); Chad Westerman, Milford, MI (US); Satya Naren Karthik Mandali, Farmington Hills, MI (US); Ankit Tiwari, Farmington Hills, MI (US)

(73) Assignee: GENTHERM INCORPORATED, Novi, MI (US)

( * ) Notice: Subject to any disclaimer, the term of this patent is extended or adjusted under 35 U.S.C. 154(b) by 0 days.

(21) Appl. No.: 18/854,617

(22) PCT Filed: May 3, 2023

(86) PCT No.: PCT/US2023/020783
§ 371 (c)(1),
(2) Date: Oct. 7, 2024

(87) PCT Pub. No.: WO2023/215350
PCT Pub. Date: Nov. 9, 2023

(65) Prior Publication Data

US 2025/0229600 A1 Jul. 17, 2025

Related U.S. Application Data

(60) Provisional application No. 63/337,645, filed on May 3, 2022.

(51) Int. Cl.
*B60H 1/00* (2006.01)

(52) U.S. Cl.
CPC ....... *B60H 1/0073* (2019.05); *B60H 1/00878* (2013.01)

(58) Field of Classification Search
CPC .......................... B60H 1/0073; B60H 1/00878
(Continued)

(56) References Cited

U.S. PATENT DOCUMENTS

| | | | |
|---|---|---|---|
| 6,727,467 | B1 | 4/2004 | Hadzizukic et al. |
| 7,178,344 | B2 | 2/2007 | Bell |

(Continued)

FOREIGN PATENT DOCUMENTS

| | | |
|---|---|---|
| CN | 104081172 A | 10/2014 |
| CN | 112955723 A | 6/2021 |

(Continued)

OTHER PUBLICATIONS

Huizenga et al., A model of human physiology and comfort for assessing complex thermal environments, Center for Environmental Design Research, University of California, Berkeley, CA 94720-1839 (2021).

(Continued)

*Primary Examiner* — Tuan C To
(74) *Attorney, Agent, or Firm* — The Dobrusin Law Firm, P.C.

(57) ABSTRACT

The present disclosure relates to a method for controlling a thermal effector in a vehicle. The method comprises calculating a heat transfer rate relative to a conditioned medium and calculating a target temperature of the thermal effector required to effectuate the heat transfer rate relative to the conditioned medium. The heat transfer rate is required to arrive at the setpoint temperature of the conditioned medium. The heat transfer rate is based on a setpoint temperature and a dynamically estimated temperature of the (Continued)

conditioned medium. The thermal effector is controlled to arrive at the target temperature.

19 Claims, 5 Drawing Sheets

(58) Field of Classification Search
USPC .......................................................... 701/36
See application file for complete search history.

(56) References Cited

U.S. PATENT DOCUMENTS

| | | | | |
|---|---|---|---|---|
| 7,196,288 | B2 | 3/2007 | Weiss et al. | |
| 7,205,902 | B2 | 4/2007 | Kiribayashi | |
| 7,338,117 | B2 | 3/2008 | Iqbal et al. | |
| 7,824,099 | B2 | 11/2010 | He et al. | |
| 8,143,554 | B2 | 3/2012 | Lofy | |
| 9,002,568 | B2 | 4/2015 | Datta et al. | |
| 9,103,573 | B2 | 8/2015 | Goenka et al. | |
| 9,121,414 | B2 | 9/2015 | Lofy et al. | |
| 9,266,454 | B2 | 2/2016 | Barfuss et al. | |
| 9,298,207 | B2 | 3/2016 | Li | |
| 9,333,888 | B2 | 5/2016 | Helmenstein | |
| 9,399,480 | B2 | 7/2016 | Zhang et al. | |
| 9,555,686 | B2 | 1/2017 | Ranalli et al. | |
| 9,657,963 | B2 | 5/2017 | Lazanja et al. | |
| 9,857,107 | B2 | 1/2018 | Inaba et al. | |
| 10,266,031 | B2 | 4/2019 | Steinman et al. | |
| 10,583,713 | B2 | 3/2020 | Sagou et al. | |
| 11,267,365 | B2 * | 3/2022 | Kumaraswamy ... | H01M 10/667 |
| 2003/0109212 | A1 | 6/2003 | Hayashi et al. | |
| 2005/0193747 | A1 * | 9/2005 | Kajimoto ........... | B60H 1/00778 62/133 |
| 2005/0199735 | A1 * | 9/2005 | Eisenhour ................ | G01K 7/42 236/1 C |
| 2009/0159256 | A1 | 6/2009 | Isoda et al. | |
| 2014/0278201 | A1 | 9/2014 | Shimizu | |
| 2014/0290631 | A1 | 10/2014 | Henry et al. | |
| 2016/0257272 | A1 | 9/2016 | Ruthinowski | |
| 2017/0129375 | A1 | 5/2017 | Zhang | |
| 2017/0182861 | A1 | 6/2017 | Steinman et al. | |
| 2018/0136051 | A1 | 5/2018 | Ishii | |
| 2018/0195911 | A1 | 7/2018 | Kakade et al. | |
| 2018/0345753 | A1 | 12/2018 | Beloe | |
| 2019/0101945 | A1 | 4/2019 | Marquette et al. | |
| 2019/0291613 | A1 | 9/2019 | Gupta et al. | |
| 2019/0366799 | A1 | 12/2019 | Czerwonka et al. | |
| 2020/0103293 | A1 | 4/2020 | Rud et al. | |
| 2020/0119625 | A1 | 4/2020 | Yang et al. | |
| 2020/0391572 | A1 | 12/2020 | Tsukagishi et al. | |
| 2021/0061130 | A1 * | 3/2021 | Kumaraswamy ... | H01M 10/625 |
| 2021/0276463 | A1 | 9/2021 | Wolas et al. | |
| 2022/0066067 | A1 | 3/2022 | D'Amelio et al. | |
| 2022/0371397 | A1 * | 11/2022 | Miyoshi ................. | B60K 11/02 |
| 2023/0036016 | A1 * | 2/2023 | Jovovic ................ | B60H 1/2227 |
| 2023/0304816 | A1 * | 9/2023 | Hegde ................... | B60W 40/08 |

FOREIGN PATENT DOCUMENTS

| | | | | | |
|---|---|---|---|---|---|
| DE | 102019108283 | A1 | | 10/2020 | |
| EP | 1356966 | A2 | * | 10/2003 | ......... B60H 1/00828 |
| FR | 3 088 259 | A1 | | 5/2020 | |
| GB | 2137777 | B | * | 5/1986 | ......... B60H 1/00878 |
| JP | 2005-306196 | A | | 11/2005 | |
| JP | 2007-010436 | A | | 1/2007 | |
| JP | 2007-078475 | A | | 3/2007 | |
| JP | 2009-214675 | A | | 9/2009 | |
| JP | 2018-081467 | A | | 5/2018 | |
| JP | 2018-135833 | A | | 8/2018 | |
| JP | 2022-501599 | A | | 1/2022 | |
| KR | 10-2003-0046524 | A | | 6/2003 | |
| WO | 2008/115831 | A1 | | 9/2008 | |
| WO | 2018/049159 | A1 | | 3/2018 | |
| WO | 2020094981 | A1 | | 5/2020 | |
| WO | 2020/112902 | A1 | | 6/2020 | |
| WO | 2021/102449 | A1 | | 5/2021 | |
| WO | 2021/102450 | A1 | | 5/2021 | |
| WO | 2021/126576 | A1 | | 6/2021 | |
| WO | WO-2021138579 | A1 | * | 7/2021 | ............... F24D 5/04 |
| WO | 2021/158860 | A1 | | 8/2021 | |
| WO | 2023/168060 | A1 | | 9/2023 | |
| WO | 2023/168061 | A1 | | 9/2023 | |

OTHER PUBLICATIONS

International Search Report & Written Opinion, PCT Application No. PCT/US2023/020783 dated Jun. 16, 2023.

* cited by examiner

$\dot{Q}$-env $\dot{Q}$-spcr $\dot{Q}$-containment $\dot{Q}$-occ $\dot{Q}$-con $\dot{Q}$-exch

32

40

38

42

48

34

46

36

44

METHOD FOR CONTROLLING A CONDUCTIVE OR CONVECTIVE EFFECTOR

FIELD

The present disclosure relates to a method for controlling a conductive thermal effector or convective thermal effector. The conductive thermal effector regulates a surface temperature, and the convective thermal effector regulates an airstream temperature and/or a surface temperature.

BACKGROUND

Some climatized vehicle systems operate under a set of predetermined discrete setpoints, which are selected by occupants with the actuation of buttons, dials, and the like. One drawback to these systems is the inability to regulate temperature between the setpoints. Another drawback is the continuous changing of the temperature setpoints during operation of the vehicle.

To address these challenges, some climatized vehicle systems employ sensors that monitor parameters such as the temperature of thermal effectors, blower speed, outside temperature, sun radiation, cabin air temperature, humidity, and the number of occupants. The setpoint selected by the occupant is then correlated, via lookup tables, to these parameters and thus the operation of thermal effectors (e.g., the duty cycle of a heater mat) is directed by both the setpoint and parameters. These systems operate under a finite number of pre-determined scenarios. One drawback to these systems is the large degree of calibration effort undertaken to account for the possible scenarios the vehicle may be exposed to. By way of example, systems are typically calibrated to account for driving in different seasons, geographical climates, weather conditions, and the like. Moreover, the calibrations are performed for each make, model, model year, and trim level of vehicle due to the different effects such parameters have on different vehicle builds, including the quantity and location of thermal effectors.

Typically, sensors and thermal effectors are calibrated individually. Thus, calibrations are undertaken for individual effectors. Due to this individual treatment, thermal effectors typically do not communicate with one another to cooperate in conditioning the vehicle or energy usage. Thus, where a surface is conditioned by multiple thermal effectors, ramp-up to the setpoint temperature typically proceeds slowly in an abundance of caution not to cause discomfort to the occupant.

Similarly, as the calibration accounts for cabin air temperature rather than surface temperature, the operation of thermal effectors is undertaken cautiously to avoid overheating or overcooling occupants, which may cause discomfort. Thus, the time it takes for surfaces to arrive at the selected setpoint temperature is longer relative to other methods.

Some climatized vehicle systems calibrate thermal effectors to specific cabin air temperatures. However, cabin air temperature does not accurately characterize the temperature felt at surfaces by occupants and is subject to constant fluctuations. While providing a sensor proximate to a surface may detect the temperature felt at that surface, several challenges are realized. Repeatable accuracy and precision in the location of these sensors may be needed for thermal effector operation to cooperate with the system's calibration. However, consistent location of these sensors may be difficult in the manufacturing process. Furthermore, the automotive industry is concerned with cost reduction, so additional sensors with their attendant costs are typically not a favorable solution. Sensors provided in or on compressible layers, such as a spacer layer in a seat, may be felt by occupants, negatively impacting comfort. Moreover, compressible layers expose sensors to repeated wear, which can diminish the integrity of the sensor over time.

There is a need for a method to control conductive thermal effectors based on dynamically estimated temperatures felt at surfaces by occupants. There is a need for a method to control convective thermal effectors based on dynamically estimated temperatures of airstreams at outlets.

There is a need for a method to utilize existing sensor and/or controller hardware to control thermal effectors.

There is a need for a method that provides control of thermal effectors to a dynamic surface temperature, unconstrained by pre-determined setpoints. There is a need for a method that provides control of thermal effectors to a dynamic airstream temperature, unconstrained by pre-determined setpoints.

There is a need for a method that obviates the need for calibrations to populate lookup tables.

There is a need for a method that provides for collaboration between thermal effectors to condition a common surface and share energy usage. There is a need for a method that provides for collaboration between thermal effectors to condition a common airstream and share energy usage.

There is a need for a method that provides for more rapid arrival at setpoints (e.g., temperature) selected by occupants, relative to conventional methods.

SUMMARY

The present disclosure provides for a method that may address at least some of the needs identified above. The present disclosure provides for a method for controlling a thermal effector in a vehicle. The method may comprise calculating a heat transfer rate relative to a conditioned medium. The heat transfer rate may be based on a setpoint temperature and a dynamically estimated temperature of the conditioned medium. The heat transfer rate may be required to arrive at the setpoint temperature of the conditioned medium. The method may comprise calculating a target temperature of the thermal effector required to effectuate the heat transfer rate relative to the conditioned medium. The method may comprise controlling the thermal effector to arrive at the target temperature.

The conditioned medium may include a surface or an airstream.

The surface may be on a vehicle component. The vehicle component may include a steering wheel, a gear shifter, a seat, a headrest, a door panel, an instrument panel, a headliner, a center console, a leg panel, a floor, or any combination thereof.

The airstream may emanate from a vent in or on a vehicle component. The vehicle component may include a steering wheel, a gear shifter, a seat, a headrest, a door panel, an instrument panel, a headliner, a center console, a leg panel, a floor, or any combination thereof.

The airstream at an outlet may be dynamically estimated.

The airstream may flow into a containment device in a vehicle component. The vehicle component may include a steering wheel, a gear shifter, a seat, a headrest, a door panel, an instrument panel, a headliner, a center console, a leg panel, a floor, or any combination thereof.

The airstream within the containment device may be dynamically estimated.

The method may comprise calculating a target temperature of a conveying medium required to effectuate the heat transfer rate relative to the conditioned medium. The target temperature of the conveying medium may be based on the heat transfer rate relative to the conditioned medium and any other heat transfer rate acting upon the conditioned medium.

The method may comprise calculating a heat transfer rate relative to the conveying medium in thermal communication with the conditioned medium. The heat transfer rate may be based on the target temperature of the conveying medium and a dynamically estimated temperature of the conveying medium.

The conveying medium may include a material layer or a heat exchanger. The material layer may be a spacer layer.

The conditioned medium may a surface. Other heat transfer rates acting upon the surface may include a heat transfer rate between a cabin environment and the surface, a heat transfer rate between an occupant and the surface, or both.

The conditioned medium may be an airstream. The other heat transfer rates acting upon the airstream may include a heat transfer rate between a conduit through which the airstream travels and the airstream.

The thermal effector applying the target temperature to the conditioned medium may include a resistance element, a thermoelectric device, or both.

The controlling step may include regulating power to the thermal effector (e.g., pulse width modulation duty cycle, constant current control, and the like) and/or a speed of a blower to achieve the setpoint temperature.

The setpoint temperature may be received by a human-machine interface from an occupant.

The heat transfer rate relative to the conditioned medium may be based on the difference between the temperature applied to the conditioned medium and the dynamically estimated temperature of the conditioned medium, a thermal resistance, a surface area through which heat transfer occurs, or any combination thereof.

The heat transfer rate relative to the conveying medium may be based on the difference between the temperature applied to the conveying medium and the dynamically estimated temperature of the conveying medium, a thermal resistance, a surface area through which heat transfer occurs, or any combination thereof.

Two or more thermal effectors may cooperate in effectuating the heat transfer rate relative to the conditioned medium.

The method may comprise calculating a total heat transfer rate required from the two or more thermal effectors to achieve the setpoint temperature of the conditioned medium.

The method may comprise portioning the total heat transfer rate equally or unequally among the two or more thermal effectors.

The target temperature calculation step may include calculating a target temperature of each of the two or more thermal effectors based on each respective portion of the total heat transfer rate attributable to each of the two or more thermal effectors.

BRIEF DESCRIPTION OF THE DRAWINGS

FIG. 5 illustrates a thermally regulated airstream and surface.

DETAILED DESCRIPTION

Figure 1:
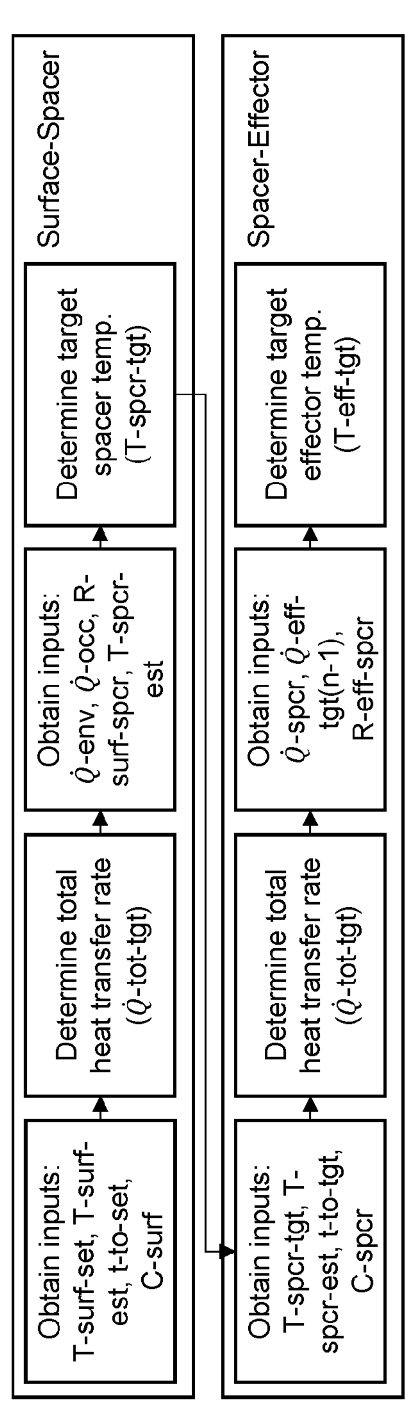
FIG. 1 illustrates the method according to the present disclosure.

The present disclosure provides for a method for controlling one or more thermal effectors. The thermal effector may condition a surface, an airstream, or both. The surface or airstream to be regulated may be referred to herein as a conditioned medium. The conditioned medium may function to exchange heat with an occupant. By way of example, an occupant may contact a conditioned surface, be contacted by radiation emanating from a surface, and/or be contacted by an airstream. The conditioned medium may be directly or indirectly in thermal communication with one or more thermal effectors. One or more conveying mediums may be disposed between the thermal effector and the conditioned medium. The conveying medium may function to convey heat between the thermal effector and the conditioned medium. The conveying medium may include material layers, heat exchangers, or both.

The surface may be any surface of a vehicle component. The surface may be located within the cabin of the vehicle. The surface may be on a trim layer. That is, the exposed, visible surfaces of the vehicle commonly contacted by occupants (e.g., seat leather or fabric). The vehicle component may include any component contacted by an occupant. The surface may exchange heat with one or more thermal effectors, one or more material layers, an occupant, cabin air, radiative heat sources, or any combination thereof.

The airstream may be expelled at an outlet (e.g., a vent). The outlet may be located in a vehicle component. Prior to reaching the outlet, the airstream may travel through one or more conduits and/or exchange heat with the one or more conduits. One or more heat exchangers and/or thermal effectors may be disposed in or on the one or more conduits. The airstream may exchange heat with the one or more thermal effectors and/or heat exchangers. The airstream may be provided to the cabin of a vehicle. The airstream may thermally communicate with cabin air and/or one or more occupants.

The vehicle component may include, but is not limited to, a steering wheel, a gear shifter, a seat, a headrest, a door panel, an instrument panel, a headliner, a center console, a leg panel, a floor, or any combination thereof. The vehicle component may be any component within the cabin of the vehicle. The vehicle component may be climate controlled. That is, the component may be heated and/or cooled to provide comfort to occupants.

Non-limiting examples of climate controlled steering wheels are described in U.S. Pat. Nos. 6,727,467 B1 and 9,399,480 B2, incorporated herein by reference for all purposes. A non-limiting example of a climate controlled gear shifter is described in U.S. Pat. No. 9,298,207 B2, incorporated herein by reference for all purposes. Non-limiting examples of climate controlled seats are described in U.S. Pat. Nos. 7,338,117 B2 (describing a ventilated seat) and 7,196,288 B2 (describing a conductively heated seat), incorporated herein by reference for all purposes. A non-limiting example of a climate controlled headrest is described in U.S. Pat. No. 9,333,888 B2, incorporated herein by reference for all purposes.

Non-limiting examples of vents located in or on seats are described in U.S. Publication Nos. 2017/0129375 A1 and 2021/0276463 A1, incorporated herein by reference for all purposes. A non-limiting example of a vent located in a headrest is described in U.S. Pat. No. 9,333,888 B2, incorporated herein by reference for all purposes. A non-limiting example of a vent located in a door is described in U.S. Publication No. 2017/0182861 A1, incorporated herein by reference for all purposes. A non-limiting example of vents located in a headliner is described in U.S. Pat. No. 10,266,031 B2, incorporated herein by reference for all purposes. Non-limiting examples of other systems for conditioning airstreams are described in U.S. Pat. Nos. 9,103,573 B2 and 9,555,686 B2, incorporated herein by reference for all purposes.

The temperature of the surfaces and/or airstream may be regulated by one or more thermal effectors ("effectors"). The thermal effectors thermally communicating with surfaces may be conductive effectors. The conductive effectors may generate heat that is ultimately conducted to a surface contacted by occupants. The conductive effectors may absorb heat from their surroundings that ultimately absorb heat from a surface contacted by occupants. A non-limiting example of a conductive effector is described in U.S. Pat. No. 9,657,963 B2 (describing a heater mat), incorporated herein by reference for all purposes.

The thermal effectors thermally communicating with airstreams may be convective effectors. The convective effectors may heat and/or cool one or more airstreams that are delivered to occupants and/or one or more surfaces. Convective effectors that condition a surface may deliver an airflow to a hermetically sealed or at least partially hermetically sealed containment device (e.g., containment bag). Thus, conditioned air may be delivered to the containment device and air within the containment device may cause heat exchange with one or more mediums in contact with the containment device. The thermal effectors may cooperate with one or more heat exchangers. The heat exchangers may function to thermally communicate with an airstream. The heat exchangers may be fabricated from a thermally conductive material (e.g., thermal conductivity of about 100 W/(m·K) or more, more preferably about 200 W/(m·K) or more, or even more preferably about 300 W/(m·K) or more). The heat exchanger may be adapted with a surface area over which an airstream travels. To this end, the heat exchanger may include a plurality of fins or corrugations, although any other suitable shape is contemplated by the present teachings. Non-limiting examples of suitable heat exchangers are described in U.S. Pat. Nos. 7,178,344 B2 and 8,143,554 B2, incorporated herein by reference for all purposes.

Heating and/or cooling may be achieved by the operation of one or more resistance elements, thermoelectric devices, or both. A non-limiting example of a resistance element is described in U.S. Pat. No. 9,657,963 B2, incorporated herein by reference for all purposes. A non-limiting example of a thermoelectric device is described in U.S. Pat. No. 9,857,107 B2, incorporated herein by reference for all purposes. Heating and/or cooling may utilize a fluid medium (e.g., air) that transports heat to and/or from an occupant, vehicle component, or both. The fluid medium may be moved by one or more blowers. Non-limiting examples of blowers are described in International Publication No. WO 2008/115831 A1 and U.S. Pat. No. 9,121,414 B2, incorporated herein by reference for all purposes.

The thermal effectors may be controlled to provide heating and/or cooling that corresponds with an operation mode and/or a setpoint temperature. The operation mode and/or setpoint temperature may be determined by occupants' interaction with a human-machine interface (HMI). The operation mode and/or setpoint temperature may be determined by occupants' actuation of one or more knobs, buttons, dials, toggles, switches, the like, or any combination thereof. The operation mode and/or setpoint temperature may be determined by an autonomous control system. These systems may account for one or more sensor inputs and regulate the setpoints autonomously via one or more controllers. The operation mode may be ON or OFF. The thermal effectors may be operated by regulating power thereto (e.g., pulse width modulation duty cycle, constant current control, and the like). The duty cycle may operate to ramp-up to achieve, and then maintain the setpoint temperature, at least until the operation mode changes or the setpoint temperature changes by the direction of the occupant. The duty cycle may operate in accordance with the difference between a dynamically estimated surface temperature and the setpoint temperature.

The method of the present disclosure may at least partially rely on dynamic estimations of temperatures. Dynamic estimations of surface temperatures are disclosed in U.S. Application No. 63/316,762. Dynamic estimations of airstream temperatures are disclosed in U.S. Application No. 63/316,779. The dynamic estimation may be based on one or more heat transfer rates, a thermal capacitance, a program cycle time, and a temperature from a prior program cycle. The rate of heat transfer between two mediums is generally based on the difference in temperature between the two mediums, the surface area across which the heat transfer is occurring, one or more thermal resistances, or any combination thereof. The thermal capacitance, cycle time, thermal resistance, surface area, or any combination thereof may be pre-determined values. Other pre-determined values may be appreciated by the present teachings. Current and prior program cycle temperatures may be provided by prior dynamic estimations or sensor inputs. Thus, the heat transfer rates and dynamically estimated temperatures through any number of successive thermal mediums may be determined based on just one variable input (e.g., thermal effector temperature).

The method of the present disclosure may estimate the temperature of a surface and/or airstream and continuously update the temperature estimation. Thus, the method of the present disclosure may adapt to constantly fluctuating ambient cabin conditions. The method of the present disclosure may adapt in real-time, providing consistent thermal comfort to occupants.

The control method may be based on a relatively small set of pre-determined values compared to conventional methods and systems. These values may include thermal resistances, thermal capacitances, surface areas, time to achieve temperature, or any combination thereof. These values are non-limiting and others may be realized by the present disclosure. These values may be stored in one or more transient or non-transient memory storage mediums.

The control method may employ one or more look-up tables, transfer functions, equations, or any combination thereof. The equations and/or transfer functions may be provided inputs from human-machine interfaces, calculations from other modules (e.g., dynamic temperature estimation and/or heat transfer rate calculation modules), pre-determined values (e.g., thermal resistances and thermal capacitances), or any combination thereof. Sensor inputs may be obtained in real-time. Calculations from other modules and/or pre-determined values may be obtained from a transient or non-transient memory storage medium.

Estimation, as referred to herein, may mean the calculation of a parameter understanding that the result of such calculation may not exactly correspond with the actual value (e.g., temperature of a surface). Thus, the result of such calculation may be an estimate of the actual value. The system and method of the present disclosure may provide an estimate that deviates about 10% or less, more preferably 5% or less, or even more preferably 1% or less from the actual value.

Any calculation, dynamic estimation, storage, transmission, determining, and/or obtaining step recited herein may be performed by one or more controllers. The controllers may include one or more dedicated effector controllers, dedicated system controllers, vehicle controllers, or any combination thereof. Calculations and dynamic estimations may be performed by one controller or distributed between a plurality of controllers. Any non-transient values (e.g., pre-determined values) or inputs may be stored locally on and/or remote from the controllers. Any inputs that are calculated or estimated from other modules may be stored locally on and/or remote from the controllers. Any inputs that are calculated or estimated from other modules may be stored temporarily on the controllers. Any calculated or estimated inputs from other modules may be replaced or updated by newly provided inputs that are calculated or estimated from other modules. The foregoing is applicable to all embodiments.

Any communication or transmission between different controllers, sensors, and/or other devices may be via a local interconnect network (LIN) bus. Communications or transmissions may occur from a sensor to a controller or from a controller to another controller. By way of example but not limitation, an occupancy sensor may transmit an occupancy status to a vehicle controller, and then the vehicle controller may transmit the occupancy signal to a dedicated effector controller. The foregoing is applicable to all embodiments.

Vehicle, as referred to herein, may mean any automobile, recreational vehicle, sea vessel, air vessel, the like, or any combination thereof. While the present disclosure discusses the conditioning of a vehicle and surfaces thereof, the teachings herein may be adapted for any space that is conditioned with surfaces that may directly and/or radiatively thermally communicate with individuals. By way of example, the present teachings may be applied to furniture (e.g., chairs and beds), buildings, the like, or any combination thereof.

Any reference to heat transfer rates and dynamically estimated temperatures may refer to the current heat transfer rates and current dynamically estimated temperatures. That is, these values may be ultimately determined by one or more sensor inputs from one or more sensors at current time and/or one or more calculations performed at current time (e.g., from an immediately prior program cycle and/or a current program cycle).

The present method may be employed to regulate the temperature of a surface. The surface temperature may be regulated by one or more thermal effectors. Ultimately, regulation of surface temperature is determined by the difference between the current temperature of the surface and the setpoint temperature. That is, the quantity of energy supplied to a thermal effector and the amount of time to supply said energy in order to effectuate a setpoint surface temperature may be ultimately determined by the difference between the current temperature of the surface and the setpoint temperature.

The method may comprise calculating the surface temperature change ($\Delta T_{surf}$) from the dynamically estimated surface temperature ($T_{surf\text{-}est}$) required to achieve the setpoint surface temperature ($T_{surf\text{-}set}$). The surface temperature change ($\Delta T_{surf}$) may be determined from the current dynamically estimated surface temperature ($T_{surf\text{-}est}$) and the setpoint temperature ($T_{surf\text{-}set}$). The surface temperature may be dynamically estimated ($T_{surf\text{-}est}$), as taught in U.S. Provisional Application No. 63/316,762, incorporated herein by reference for all purposes. The dynamically estimated surface temperature ($T_{surf\text{-}est}$) may be the current dynamically estimated surface temperature. That is, the dynamic estimation may be ultimately based on one or more sensor inputs currently obtained from one or more sensors (e.g., one or more sensors associated with one or more thermal effectors). The setpoint temperature ($T_{surf\text{-}set}$) may be received from an occupant by a human-machine interface (HMI). The surface temperature change ($\Delta T_{surf}$) may be determined per the following equation.

$$\Delta T_{surf} = T_{surf-set} - T_{surf-est} \qquad \text{Eq. A}$$

The method may comprise calculating the surface temperature change rate ($\dot{T}_{surf}$). The surface temperature change rate ($\dot{T}_{surf}$) may be determined from the surface temperature change ($\Delta T_{surf}$) (see Eq. A) and the time it takes to achieve the setpoint temperature ($t_{to\text{-}set}$). The time it takes to achieve the setpoint temperature may be a fixed value or may vary. The time it takes to achieve the setpoint temperature may be stored in a memory storage medium. The surface temperature change rate ($\dot{T}_{surf}$) may be calculated per the following equation.

$$\dot{T}_{surf} = \Delta T_{surf} \times t_{to-set} \qquad \text{Eq. B}$$

The method may comprise calculating the target total heat transfer rate with the surface ($\dot{Q}_{tot\text{-}tgt}$) required to achieve the surface temperature change rate ($\dot{T}_{surf}$). The target total heat transfer rate ($\dot{Q}_{tot\text{-}tgt}$) may be determined from the surface temperature change rate ($\dot{T}_{surf}$) (see Eq. B) and the thermal capacitance of the surface ($C_{surf}$). The target total heat transfer rate with the surface ($\dot{Q}_{tot\text{-}tgt}$) may be calculated per the following equation.

$$\dot{Q}_{tot-tgt} = \dot{T}_{surf} \times C_{surf} \qquad \text{Eq. C}$$

The method may comprise calculating the target heat transfer rate between a material layer (e.g., a spacer layer) and the surface ($\dot{Q}_{sper\text{-}tgt}$). Reference to a spacer layer is made herein. The spacer layer may function to space thermal effectors from a surface, provide electrical insulation, protect thermal effectors and/or sensors from wear and/or damage, or any combination thereof. However, the present teachings are not limited to the material layer being a spacer layer. One or more material layers may be disposed between the thermal effectors and the surface. Typically, a spacer layer is disposed between the thermal effectors and the surface.

The target heat transfer rate with the surface may be achieved by the sum of all heat transfers with respect to the surface. Heat may be transferred with the surface by any medium in thermal communication with the surface. Heat may be transferred with the surface by one or more thermal effectors, one or more material layers, the cabin environment, the occupant, or any combination thereof. The present method is ultimately concerned with the heat transfer attributable to the thermal effectors. Heat generated by thermal effectors may be transferred through one or more material layers ultimately to the surface. In another aspect where the thermal effector is adapted to cool the surface, heat may be transferred through one or more material layers ultimately to the thermal effector. Thus, the target heat transfer rate from any material layers to the surface may be determined.

The target heat transfer rate between the spacer and the surface ($\dot{Q}_{spcr-tgt}$) may be determined from the target total heat transfer rate with the surface ($\dot{Q}_{tot-tgt}$) (see Eq. C), the heat transfer rate between the environment and the surface ($\dot{Q}_{env}$), the heat transfer rate between an occupant and the surface ($\dot{Q}_{occ}$), or any combination thereof. The heat transfer rate between the environment and the surface ($\dot{Q}_{env}$) and/or the heat transfer rate between an occupant and the surface ($\dot{Q}_{occ}$) may be determined as taught in U.S. Provisional Application No. 63/316,762, incorporated herein by reference for all purposes. Eq. D below accounts for positive $\dot{Q}_{env}$ and $\dot{Q}_{occ}$ values (e.g., heat flowing into the surface from the environment and occupant). Thus, $\dot{Q}_{env}$ and $\dot{Q}_{occ}$ are subtracted from $\dot{Q}_{tot-tgt}$. The present disclosure contemplates that heat can flow from or into the environment and/or occupant relative to the surface and thus the circumstances may direct whether $\dot{Q}_{env}$ and $\dot{Q}_{occ}$ are added to or subtracted from $\dot{Q}_{tot-tgt}$. The target heat transfer rate between the spacer and the surface ($\dot{Q}_{spcr-tgt}$) may be calculated per the following equation.

$$\dot{Q}_{spcr-tgt} = \dot{Q}_{tot-tgt} - \dot{Q}_{env} - \dot{Q}_{occ} \qquad \text{Eq. D}$$

The method may comprise calculating the target spacer temperature ($T_{spcr-tgt}$) required to achieve the target heat transfer rate between the spacer and the surface ($\dot{Q}_{spcr-tgt}$). The target spacer temperature ($T_{sper-tgt}$) may be determined from the target heat transfer rate between the spacer and the surface ($\dot{Q}_{spcr-tgt}$) (see Eq. D), the thermal resistance between the surface and the spacer ($R_{surf-spcr}$), and the current dynamically estimated spacer temperature ($T_{spcr-est}$). The current dynamically estimated spacer temperature ($T_{spcr-est}$) may be determined as taught in U.S. Provisional Application No. 63/316,762, incorporated herein by reference for all purposes. The target spacer temperature ($T_{spcr-tgt}$) required to achieve the target heat transfer rate between the spacer and the surface ($\dot{Q}_{spcr-tgt}$) may be calculated per the following equation.

$$T_{spcr-tgt} = (\dot{Q}_{spcr-tgt} \times R_{surf-spcr}) + T_{spcr-est} \qquad \text{Eq. E}$$

The method may comprise calculating the temperature change ($\Delta T_{sper}$) from the current dynamically estimated spacer temperature ($T_{sper-est}$) required to achieve the target spacer temperature ($T_{spcr-tgt}$). The temperature change ($\Delta T_{sper}$) may be determined from the current dynamically estimated spacer temperature ($T_{spcr-est}$) and the target spacer temperature ($T_{sper-tgt}$) (see Eq. E). The current dynamically estimated spacer temperature ($T_{sper-est}$) may be determined as taught in U.S. Provisional Application No. 63/316,762, incorporated herein by reference for all purposes. The temperature change ($\Delta T_{sper}$) may be calculated per the following equation.

$$\Delta T_{spcr} = T_{spcr-tgt} - T_{spcr-est} \qquad \text{Eq. F}$$

As will be appreciated by the present teachings, the computative flow presented in Eq. A through Eq. E may be repeated for every layer in the system, from the surface to be regulated to the one or more thermal effectors. That is, the heat transfers and associated temperatures of each layer may be determined. Typically, a spacer layer is disposed between the surface and one or more thermal effectors. However, one or more other material layers may be present. Moreover, the present teachings contemplate that one or more thermal effectors directly thermally communicate with the surface, with no intervening layers disposed therebetween.

The method may comprise calculating the spacer temperature change rate ($\dot{T}_{spcr}$). The spacer temperature change rate ($\dot{T}_{spcr}$) may be determined from the spacer temperature change ($\Delta T_{sper}$) (see Eq. F) and the time it takes to achieve the target temperature ($t_{to-tgt}$). The time it takes to achieve the target temperature may be a fixed value or may vary. The time it takes to achieve the target temperature may be stored in a memory storage medium. The spacer temperature change rate ($\dot{T}_{spcr}$) may be calculated per the following equation.

$$\dot{T}_{spcr} = \Delta T_{spcr} \times t_{to-tgt} \qquad \text{Eq. G}$$

The method may comprise calculating the target total heat transfer rate with the spacer ($\dot{Q}_{tot-tgt}$) required to achieve the spacer temperature rate of change ($\dot{T}_{spcr}$). The target total heat transfer rate with the spacer ($\dot{Q}_{tot-tgt}$) may be calculated from the spacer temperature rate of change ($\dot{T}_{spcr}$) (see Eq. G) and the thermal capacitance of the spacer ($C_{sper}$). The target total heat transfer rate with the spacer ($\dot{Q}_{tot-tgt}$) may be calculated, per the following equation.

$$\dot{Q}_{tot-tgt} = \dot{T}_{spcr} \times C_{spcr} \qquad \text{Eq. H}$$

The method may comprise calculating the target total heat transfer rate between one or more thermal effectors and the spacer layer ($\dot{Q}_{eff-tgt}$). The target total heat transfer rate between one or more thermal effectors and the spacer layer ($\dot{Q}_{eff-tgt}$) may be calculated from the total heat transfer rate with the spacer ($\dot{Q}_{tot-tgt}$) (see Eq. H) and the heat transfer rate between the spacer and any other medium ($\dot{Q}_{spcr}$) (e.g., the surface). Eq. I below accounts for a negative $\dot{Q}_{sper}$ value (e.g., heat flowing into the surface from the spacer). Thus, $\dot{Q}_{sper}$ is added to $\dot{Q}_{tot-tgt}$. The present disclosure contemplates that heat can flow from or into the spacer relative to the surface and thus the circumstances may direct whether $\dot{Q}_{sper}$ is added to or subtracted from $\dot{Q}_{tot-tgt}$. The target heat transfer rate from one or more thermal effectors to the spacer layer ($\dot{Q}_{eff-tgt}$) may be calculated per the following equation.

$$\dot{Q}_{eff-tgt} = \dot{Q}_{tot-tgt} + \dot{Q}_{spcr} \qquad \text{Eq. I}$$

The above steps may be performed by a dedicated system controller and the steps discussed below may be performed by dedicated effector controllers. Both the above steps and the below steps may be performed by dedicated effector controllers.

The method may comprise calculating the target heat transfer rate for a particular (individual) thermal effector ($\dot{Q}_{eff-tgt(n)}$). One or more thermal effectors may act upon a material layer. Where two or more thermal effectors are employed, then they may cooperate in effectuating heat transfers to the material layer. Multiple thermal effectors may function in a hierarchy. That is, each active thermal effector may contribute to progressively less and less heat transfer. Not all thermal effectors may function at any given time. The quantity of thermal effectors functioning at one time may depend on the magnitude of temperature change required. By way of example, a temperate change of 1° C. may only require the functioning of one thermal effector, whereas a temperature change of 10° C. may require the functioning of two or more thermal effectors.

Thermal effectors may be in signal communication with one another to communicate their energy usage with one another. Thermal effectors may be in signal communication with a dedicated system controller, and the dedicated system controller may communicate energy usages of thermal effectors to other thermal effectors.

The target heat transfer rate relative to an individual thermal effector ($\dot{Q}_{eff\text{-}tgt(n)}$) may be determined from the target heat transfer rate from all thermal effectors to the spacer layer ($\dot{Q}_{eff\text{-}tgt}$) (see Eq. I) and the target heat transfer rate relative to any other individual thermal effectors lower in the hierarchy ($\dot{Q}_{eff\text{-}tgt(n-1)}$). Where the system comprises two or more thermal effectors, the thermal effectors may cooperate in effectuating the setpoint temperature on the surface. The heat transfer rates may be equally or unequally distributed among the two or more thermal effectors. Where the heat transfer rates are effectuated unequally, the thermal effectors may function in a hierarchy. That is, the thermal effector highest in the hierarchy may contribute the largest magnitude of heat transfer rate, the thermal effector next in the hierarchy may contribute a lesser magnitude of heat transfer rate relative to the immediately higher-ranked thermal effector, and so on. It may be appreciated that any number of individual thermal effectors lower in the hierarchy (e.g., $\dot{Q}_{eff\text{-}tgt(n-2)}$, $\dot{Q}_{eff\text{-}tgt(n-3)}$, and so on) may be considered in this determination. The target heat transfer rate for a particular thermal effector ($\dot{Q}_{eff\text{-}tgt(n)}$) may be calculated per the following equation.

$$\dot{Q}_{eff-tgt(n)} = \dot{Q}_{eff-tgt} - \dot{Q}_{eff-tgt(n-1)} \qquad \text{Eq. J}$$

The method may comprise calculating the target temperature to be reached by the individual thermal effector ($T_{eff\text{-}tgt}$). The target temperature to be reached by the individual thermal effector ($T_{eff\text{-}tgt}$) may be determined from the heat flow rate to be reached by the individual thermal effector ($\dot{Q}_{eff\text{-}tgt(n)}$) (see Eq. J) and the thermal resistance between the effector and the spacer (Ref-spcr).

$$T_{eff-tgt} = \dot{Q}_{eff-tgt(n)} \times R_{eff-spcr} \qquad \text{Eq. K}$$

Thus, the thermal effectors may be regulated to achieve the target effector temperature ($T_{eff\text{-}tgt}$). A temperature sensor local to the thermal effector may be employed to determine when the target effector temperature ($T_{eff\text{-}tgt}$) is achieved.

The present method may be employed to regulate the temperature of an airstream. The airstream temperature may be regulated by one or more thermal effectors. Ultimately, regulation of an airstream temperature is determined by the difference between the current temperature and the setpoint temperature. That is, the quantity of energy supplied to a thermal effector and the amount of time to supply said energy in order to effectuate a setpoint airstream temperature may be ultimately determined by the difference between the current temperature and the setpoint temperature.

The method may comprise calculating the airstream temperature change ($\Delta T_{air}$) from the dynamically estimated airstream temperature ($T_{air\text{-}est}$) required to achieve the setpoint airstream temperature ($T_{air\text{-}set}$). The airstream temperature change ($\Delta T_{air}$) may be determined from the current dynamically estimated airstream temperature ($T_{air\text{-}est}$) and the setpoint temperature ($T_{air\text{-}set}$). The current airstream temperature may be dynamically estimated ($T_{air\text{-}est}$), as taught in U.S. Provisional Application No. 63/316,779, incorporated herein by reference for all purposes. The setpoint temperature ($T_{air\text{-}set}$) may be received by a human-machine interface (HMI). The temperature change ($\Delta T_{air}$) may be determined per the following equation.

$$\Delta T_{air} = T_{air-set} - T_{air-est} \qquad \text{Eq. L}$$

The method may comprise calculating the airstream temperature change rate ($\dot{T}_{air}$). The airstream temperature change rate ($\dot{T}_{air}$) may be determined from the airstream temperature change ($\Delta T_{air}$) (see Eq. L) and the time it takes to achieve the setpoint temperature ($t_{to\text{-}set}$). The time it takes to achieve the setpoint temperature may be a fixed value or may vary. The time it takes to achieve the setpoint temperature may be stored in a memory storage medium. The airstream temperature rate of change ($\dot{T}_{air}$) may be calculated per the following equation.

$$\dot{T}_{air} = \Delta T_{air} \times t_{to-set} \qquad \text{Eq. M}$$

The method may comprise calculating the target total heat transfer rate ($\dot{Q}_{tot\text{-}tgt}$) with the airstream required to achieve the airstream temperature change rate ($\dot{T}_{air}$). The total heat transfer rate ($\dot{Q}_{tot}$) may be determined from the airstream temperature change rate ($\dot{T}_{air}$) (see Eq. M) and the thermal capacitance of air ($C_{air}$). The total heat transfer rate ($\dot{Q}_{tot}$) may be calculated per the following equation.

$$\dot{Q}_{tot-tgt} = \dot{T}_{air} \times C_{air} \qquad \text{Eq. N}$$

Since the heat flow rate includes a time component, the time during which heat flows between two mediums affects the temperature imparted upon a medium. Where an airflow travels through a conduit and/or over a heat exchanger, the time a portion of an airflow is in contact with a medium it exchanges heat with (e.g., a conduit and/or heat exchanger) affects the temperature imparted upon the airflow. The airflow may be generated by a blower. The blower may comprise a fan (e.g., radial or axial fan). The speed of the fan may direct the speed of the airflow and thus, the time the airflow is in contact with the conduit, heat exchanger, or both. The power to the blower may be controlled (e.g., pulse width modulation duty cycle, constant current control, and the like) to achieve the setpoint temperature.

The method may comprise calculating the target total heat transfer rate between a heat exchanger and the airstream ($\dot{Q}_{exch\text{-}tgt}$). One or more heat exchangers may exchange heat with the airstream. Where multiple heat exchangers are employed, the target total heat transfer rate may be shared therebetween. The target total heat transfer rate between the heat exchanger and the airstream ($\dot{Q}_{exch\text{-}tgt}$) may be determined from the target total heat transfer rate with the airstream ($\dot{Q}_{tot\text{-}tgt}$) (see Eq. N), the heat transfer rate between a conduit and the airstream ($\dot{Q}_{con}$), or any combination thereof. The heat transfer rate between the conduit and the airstream ($\dot{Q}_{con}$) may be determined as taught in U.S. Provisional Application No. 63/316,779, incorporated herein by reference for all purposes. Eq. O below accounts for a positive $\dot{Q}_{con}$ value (e.g., heat flowing into the airstream from the conduit). Thus, $\dot{Q}_{con}$ is subtracted from $\dot{Q}_{tot\text{-}tgt}$. The present disclosure contemplates that heat can flow from or into the airflow relative to the conduit and thus the circumstances may direct whether $\dot{Q}_{con}$ is added to or subtracted from $\dot{Q}_{tot\text{-}tgt}$. The target heat transfer rate from the heat exchanger to the airstream ($\dot{Q}_{exch\text{-}tgt}$) may be calculated per the following equation.

$$\dot{Q}_{exch-tgt} = \dot{Q}_{tot-tgt} - \dot{Q}_{con} \quad \text{Eq. O}$$

The method may comprise calculating the target heat exchanger temperature ($T_{exch\text{-}tgt}$) required to achieve the target total heat transfer rate between the heat exchanger and the airstream ($\dot{Q}_{exch\text{-}tgt}$). The target heat exchanger temperature ($T_{exch\text{-}tgt}$) may be determined from the target total heat transfer rate between the heat exchanger and the airstream ($\dot{Q}_{exch\text{-}tgt}$) (see Eq. O), the thermal resistance between the heat exchanger and the airstream ($R_{exch\text{-}air}$), and the current dynamically estimated heat exchanger temperature ($T_{exch\text{-}est}$). The current dynamically estimated heat exchanger temperature ($T_{exch\text{-}est}$) may be determined as taught in U.S. Provisional Application No. 63/316,779, incorporated herein by reference for all purposes. The target heat exchanger temperature ($T_{exch\text{-}tgt}$) required to achieve the target total heat transfer rate between the heat exchanger and the airstream ($\dot{Q}_{exch\text{-}tgt}$) may be calculated per the following equation.

$$T_{exch-tgt} = \left(\dot{Q}_{exch-tgt} \times R_{exch-air}\right) + T_{exch-est} \quad \text{Eq. P}$$

The method may comprise calculating the temperature change ($\Delta T_{exch}$) from the current dynamically estimated heat exchanger temperature ($T_{exch\text{-}est}$) required to achieve the target heat exchanger temperature ($T_{exch\text{-}tgt}$). The temperature change ($\Delta T_{exch}$) may be determined from the current dynamically estimated heat exchanger temperature ($T_{exch\text{-}est}$) and the target heat exchanger temperature ($T_{exch\text{-}tgt}$) (see Eq. P). The current dynamically estimated heat exchanger temperature ($T_{exch\text{-}est}$) may be determined as taught in U.S. Provisional Application No. 63/316,779, incorporated herein by reference for all purposes. The temperature change ($\Delta T_{exch}$) may be calculated per the following equation.

$$\Delta T_{exch} = T_{exch-tgt} - T_{exch-est} \quad \text{Eq. Q}$$

As will be appreciated by the present teachings, the computative flow presented in Eq. L through Eq. Q may be repeated for every layer in the system. That is, the heat transfers and associated temperatures of each layer may be determined from the airstream to be regulated to the one or more thermal effectors. Typically, a heat exchanger is in thermal communication with the thermal effector and the airstream. One or more other layers (e.g., thermal paste between the heat exchanger and thermal effector) may be present.

The method may comprise calculating the heat exchanger temperature change rate ($\dot{T}_{exch}$). The heat exchanger temperature change rate ($\dot{T}_{exch}$) may be determined from the heat exchanger temperature change ($\Delta\dot{T}_{exch}$) (see Eq. Q) and the time it takes to achieve the target temperature ($t_{to\text{-}tgt}$). The time it takes to achieve the target temperature may be a fixed value or may vary. The time it takes to achieve the target temperature may be stored in a memory storage medium. The heat exchanger temperature rate of change ($\dot{T}_{exch}$) may be calculated per the following equation.

$$\dot{T}_{exch} = \Delta T_{exch} \times t_{to-tgt} \quad \text{Eq. R}$$

The method may comprise calculating the target total heat transfer rate with the heat exchanger ($\dot{Q}_{tot\text{-}tgt}$) required to achieve the heat exchanger temperature change rate ($\dot{T}_{exch}$). The target total heat transfer rate with the heat exchanger ($\dot{Q}_{tot\text{-}tgt}$) may be determined from the heat exchanger temperature change rate ($\dot{T}_{exch}$) (see Eq. R) and the thermal capacitance of the heat exchanger ($C_{exch}$). The target total heat transfer rate with the heat exchanger ($\dot{Q}_{tot\text{-}tgt}$) may be calculated per the following equation.

$$\dot{Q}_{tot-tgt} = \dot{T}_{exch} \times C_{exch} \quad \text{Eq. S}$$

The total heat transfer rate with the heat exchanger ($\dot{Q}_{tot\text{-}tgt}$) required to achieve the heat exchanger temperature change rate ($\dot{T}_{exch}$) may be provided by one or more thermal effectors. The method may comprise calculating the target temperature to be reached by the thermal effector ($T_{eff\text{-}tgt}$). The target temperature to be reached by the thermal effector ($T_{eff\text{-}tgt}$) may be determined from the required total heat transfer rate with the heat exchanger ($\dot{Q}_{tot\text{-}tgt}$) (see Eq. S) and the thermal resistance between the thermal effector and the heat exchanger ($R_{eff\text{-}exch}$).

$$T_{eff-tgt} = \dot{Q}_{tot-tgt} \times R_{eff-exch} \quad \text{Eq. T}$$

Thus, the thermal effector may be regulated to achieve the target effector temperature ($T_{eff\text{-}tgt}$). A temperature sensor local to the thermal effector may be employed to determine when the target effector temperature ($T_{eff\text{-}tgt}$) is achieved.

An airstream may be delivered to a containment device (e.g., containment bag). The containment device may be located in a vehicle to ultimately exchange heat with a surface. By way of example, the containment device may be located underneath a material layer and the material layer may be disposed between the containment device and the surface.

The containment device may function as the thermal effector that ultimately thermally communicates with a surface. An airstream delivered into the containment bag may thermally communicate with one or more thermal effectors (e.g., thermoelectric device). The one or more thermal effectors may be located upstream of the containment device. Thus, both of the airstream temperature control method and the surface temperature control method described herein may be employed in cooperation to control the temperature of a surface.

The surface temperature may be regulated. Thus, the method for surface temperature control may be employed to determine the target containment device temperature. The target containment device temperature may be analogous to the target effector temperature discussed hereinbefore. This method may be employed in the same order or different order as disclosed hereinbefore. This method may include all or at least a portion of the steps disclosed hereinbefore. The target containment device temperature may be analogous to the setpoint airstream temperature. Thus, the method for airstream temperature control may be employed to determine the target thermal effector temperature in order to effectuate the target containment device temperature. This method may be employed in the same order or different order as disclosed hereinbefore. This method may include all or at least a portion of the steps disclosed hereinbefore.

The above steps may be performed by a dedicated system controller, an effector controller, or both.

FIG. 1 illustrates the method according to the present disclosure. The method is adapted to regulate the temperature of a surface. The surface temperature is ultimately effectuated by one or more thermal effectors. As illustrated, a spacer layer disposed between the surface and the thermal effector is factored into the methodology. The thermal effector thermally communicates with the spacer layer, which, in turn, thermally communicates with a surface. The present disclosure contemplates that no material layer is disposed between the thermal effector and the surface. The present disclosure contemplates that multiple material layers (e.g., including a spacer layer) are disposed between the thermal effector and the surface.

The method comprises determining the target total heat transfer rate with the surface. To this end, the surface setpoint temperature, current dynamically estimated surface temperature, target time in which to achieve the setpoint temperature, and thermal capacitance of the surface are employed as inputs.

The method comprises determining the target spacer temperature required to achieve the target total heat transfer rate between the surface and the spacer. To this end, the target total heat transfer rate between the surface and the spacer, the heat transfer rate between the surface and the cabin environment, the heat transfer rate between the surface and the occupant, the thermal resistance between the surface and the spacer, and the current dynamically estimated spacer temperature are employed as inputs.

The target spacer temperature is employed in the following calculations. The method comprises determining the target total heat transfer rate with the spacer. To this end, the target spacer temperature, current dynamically estimated spacer temperature, target time in which to achieve the target spacer temperature, and thermal capacitance of the spacer are employed as inputs.

The method comprises determining the target total heat transfer rate between the spacer and one or more co-located thermal effectors. To this end, the target total heat transfer rate with the spacer, and the heat transfer rate between the spacer and the surface are employed as inputs.

The target total heat transfer rate between the spacer and the one or more co-located thermal effectors is employed in the following calculations. The method comprises determining the target heat transfer rate between the spacer and an individual thermal effector. To this end, the target heat transfer rate between the spacer and all co-located thermal effectors, and the current heat transfer rate between the spacer and certain other co-located thermal effectors, are employed as inputs.

The method comprises determining the target individual thermal effector temperature required to achieve the target heat transfer rate between the spacer and the individual thermal effector. To this end, the target heat transfer rate between the spacer and the individual thermal effector, and the thermal resistance between the thermal effector and the spacer are employed as inputs.

Figure 2:
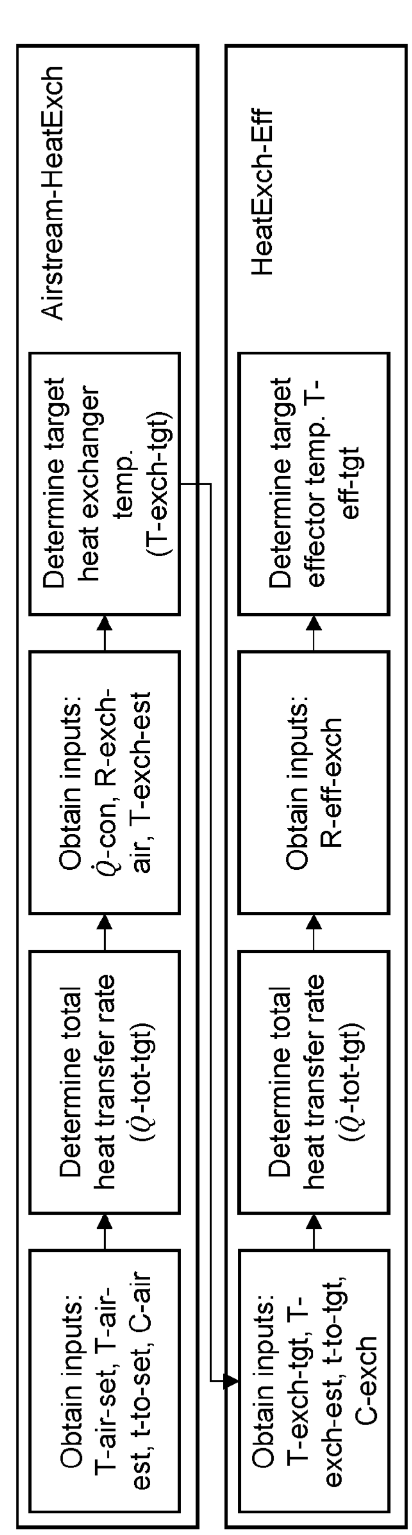
FIG. 2 illustrates the method according to the present disclosure.

FIG. 2 illustrates the method according to the present disclosure. The method is adapted to regulate the temperature of an airstream. The airstream temperature is ultimately effectuated by one or more thermal effectors. As illustrated, a heat exchanger disposed between the airstream and the thermal effector is factored into the methodology. The thermal effector thermally communicates with the heat exchanger, which, in turn, thermally communicates with the airstream. The present disclosure contemplates that no heat exchanger is disposed between the thermal effector and the airstream.

The method comprises determining the target total heat transfer rate with the airstream. To this end, the airstream setpoint temperature, current dynamically estimated airstream temperature, target time in which to achieve the setpoint temperature, and thermal capacitance of the airstream are employed as inputs.

The method comprises determining the target heat exchanger temperature required to achieve the target total heat transfer rate between the heat exchanger and the airstream. To this end, target total heat transfer rate with the airstream, the heat transfer rate between the airstream and the conduit, the thermal resistance between the heat exchanger and airstream, and the current dynamically estimated heat exchanger temperature are employed as inputs.

The target heat exchanger temperature is employed in the following calculations. The method comprises determining the target total heat transfer rate between the heat exchanger and the thermal effector. To this end, the target heat exchanger temperature, the current dynamically estimated heat exchanger temperature, the target time in which to achieve the target temperature, and thermal capacitance of the heat exchanger are employed as inputs.

The method comprises determining the target thermal effector temperature required to achieve the target total heat transfer rate between the heat exchanger and the thermal effector. To this end, the thermal resistance between the thermal effector and the heat exchanger is employed as an input.

Figure 3:
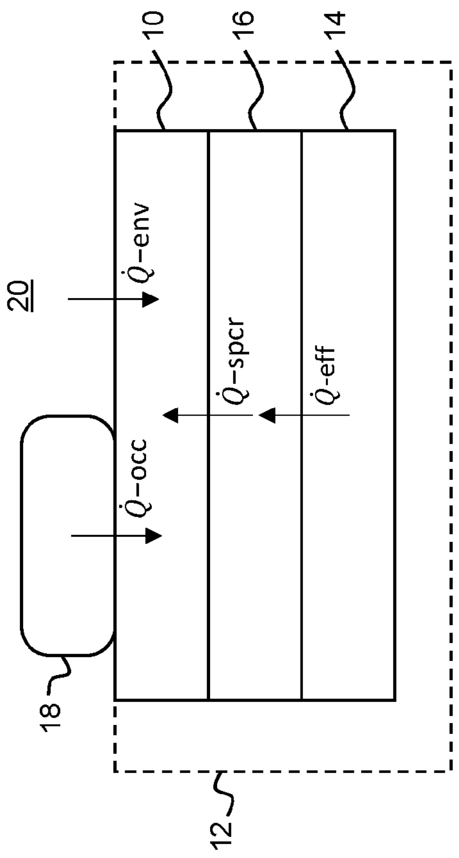
FIG. 3 illustrates a thermally regulated surface.

FIG. 3 illustrates a thermally regulated surface 10. The surface 10 is a trim layer in a vehicle seat 12, although any surface within the cabin of a vehicle may be considered in the method of the present disclosure. The surface 10 is thermally regulated by a thermal effector 14 (e.g., resistance heater mat). Heat generated by the thermal effector 14 is ultimately conducted to the surface 10. As illustrated, a material layer 16 (e.g., spacer layer) is disposed between the thermal effector 14 and the surface 10. The present teachings contemplate more than one material layer 16 disposed therebetween, as well as no material layer 16 disposed therebetween.

Control of the thermal effector 14 is ultimately determined by the heat transfer rate relative to the surface 10 required to achieve a setpoint temperature. Heat transfer rates are indicated by labelled arrows. The setpoint temperature can be directed by an occupant and/or an autonomous control system. Since the surface 10 is subject to a plurality of different heat transfer rates relative to different elements in the system, the thermal effector 14 may function cooperatively or in counteraction to those different heat transfer rates. By way of example, where a surface 10 is to be heated, heat transfer from the thermal effector 14 to the surface 10 may function cooperatively with heat transfer from an occupant 18 to the surface 10. By way of another example, where a surface 10 is to be heated, heat transfer from the thermal effector 14 to the surface 10 may function to counteract heat transfer from the surface 10 to a cold cabin environment 20 (cold relative to the temperature of the surface 10).

Figure 4:
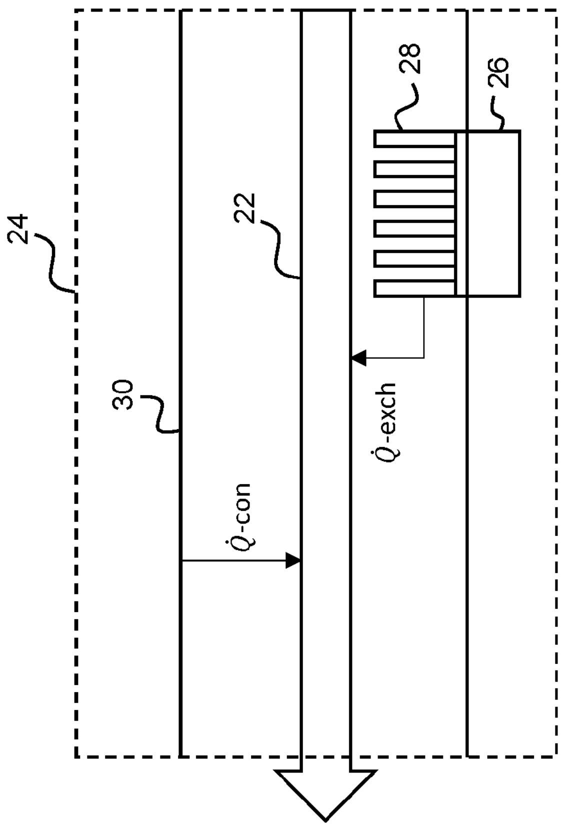
FIG. 4 illustrates a thermally regulated airstream.

FIG. 4 illustrates a thermally regulated airstream 22. As illustrated, the airstream 22 is expelled from a headrest 24, although any airstream 22 emitting from a vent within the cabin of a vehicle may be considered in the method of the present disclosure. The airstream 22 is thermally regulated by a thermal effector 26 (e.g., thermoelectric device). Heat generated by the thermal effector 26 is ultimately conducted to the airstream 22. As illustrated, the thermal effector 26 and airstream 22 thermally communicate with a heat exchanger 28. The present teachings contemplate that no heat exchanger 26 is present.

Control of the thermal effector 26 is ultimately determined by the heat transfer rate relative to the airstream 22 required to achieve a setpoint temperature. Heat transfer rates are indicated by labelled arrows. The setpoint temperature can be directed by an occupant and/or an autonomous control system. Since the airstream 22 is subject to a plurality of different heat transfer rates relative to different elements in the system, the thermal effector 26 may function cooperatively or in counteraction to those different heat transfer rates. By way of example, where an airstream 22 is to be heated, heat transfer from the thermal effector 26 to the airstream 22 may function cooperatively with heat transfer from a conduit 30, through which the airstream 22 travels, to the airstream 22. By way of another example, where an airstream 22 is to be heated, heat transfer from the thermal effector 26 to the airstream 22 may function to counteract heat transfer from the airstream 22 to a cold conduit 30 (cold relative to the temperature of the airstream 22).

Figure 5:
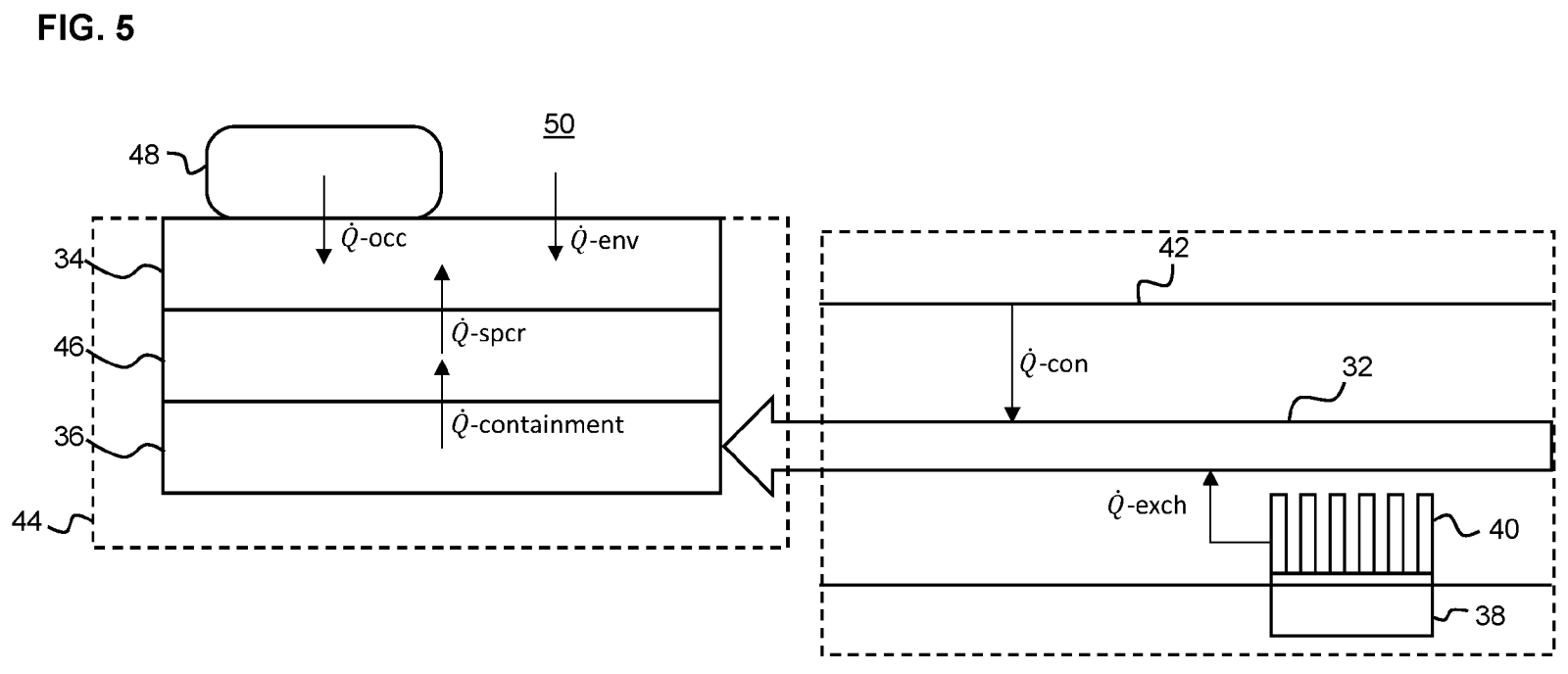

FIG. 5 illustrates a thermally regulated airstream 32 and surface 34. The airstream 32 is thermally regulated and delivered to a containment device 36. The containment device 36 then thermally regulates the surface 34. In effect, the containment device 36 functions similarly to the thermal effector 14 illustrated in FIG. 3.

The airstream 32 is thermally regulated by a thermal effector 38 (e.g., thermoelectric device). Heat generated by the thermal effector 38 is ultimately conducted to the airstream 32. As illustrated, the thermal effector 38 and airstream 32 thermally communicate with a heat exchanger 40. The present teachings contemplate that no heat exchanger 40 is present.

Control of the thermal effector 38 is ultimately determined by the heat transfer rate relative to the airstream 32 required to achieve a setpoint temperature. Heat transfer rates are indicated by labelled arrows. The setpoint temperature can be directed by an occupant and/or an autonomous control system. Since the airstream 32 is subject to a plurality of different heat transfer rates relative to different elements in the system, the thermal effector 38 may function cooperatively or in counteraction to those different heat transfer rates. By way of example, where an airstream 32 is to be heated, heat transfer from the thermal effector 38 to the airstream 32 may function cooperatively with heat transfer from a conduit 42, through which the airstream 32 travels, to the airstream 32. By way of another example, where an airstream 32 is to be heated, heat transfer from the thermal effector 38 to the airstream 32 may function to counteract heat transfer from the airstream 32 to a cold conduit 42 (cold relative to the temperature of the airstream 32).

The airstream is expelled into a containment device 36 (e.g., containment bag). The containment device 36 may be hermetically sealed or at least partially hermetically sealed. The containment device 36, by the airstream 22 flowing into the containment device 36, may thermally regulate the surface 34. As illustrated, the surface 34 is a trim layer in a vehicle seat 44, although any surface within the cabin of a vehicle may be considered in the method of the present disclosure.

Heat generated by the containment device 36 is ultimately conducted to the surface 34. As illustrated, a material layer 46 (e.g., spacer layer) is disposed between the containment device 36 and the surface 34. The present teachings contemplate more than one material layer 46 disposed therebetween, as well as no material layer 46 disposed therebetween.

Control of the airstream 32 flowing into the containment device 36 is ultimately determined by the heat transfer rate relative to the surface 34 required to achieve a setpoint temperature. Heat transfer rates are indicated by labelled arrows. The setpoint temperature can be directed by an occupant and/or an autonomous control system. Since the surface 34 is subject to a plurality of different heat transfer rates relative to different elements in the system, the containment device 36 may function cooperatively or in counteraction to those different heat transfer rates. By way of example, where a surface 34 is to be heated, heat transfer from the containment device 36 to the surface 34 may function cooperatively with heat transfer from an occupant 48 to the surface 34. By way of another example, where a surface 34 is to be heated, heat transfer from the containment device 36 to the surface 34 may function to counteract heat transfer from the surface 34 to a cold cabin environment 50 (cold relative to the temperature of the surface 34).

The explanations and illustrations presented herein are intended to acquaint others skilled in the art with the invention, its principles, and its practical application. It is understood that the above description is intended to be illustrative and not restrictive. Many embodiments as well as many applications besides the examples provided will be apparent to those of skill in the art upon reading the above description.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

The method may comprise one or more of the steps recited herein. Some of the steps may be duplicated, removed or eliminated, rearranged relative to other steps, combined into one or more steps, separated into two or more steps, or a combination thereof.

The flow charts described herein do not imply a fixed order to the steps, and embodiments of the present invention may be practiced in any order that is practicable, unless otherwise specified herein.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed herein could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes.

REFERENCE NUMERALS

10 Surface
12 Vehicle seat
14 Thermal effector
16 Material layer
18 Occupant
20 Cabin environment
22 Airstream
24 Headrest
26 Thermal effector
28 Heat exchanger
30 Conduit
32 Airstream
34 Surface
36 Containment device
38 Thermal effector
40 Heat exchanger
42 Conduit
44 Vehicle seat
46 Material layer
48 Occupant
50 Cabin environment

What is claimed is:

1. A method for controlling a thermal effector, the method comprising:

calculating a heat transfer rate relative to a conditioned medium based on a setpoint temperature and a dynamically estimated temperature of the conditioned medium, wherein the heat transfer rate is required to arrive at the setpoint temperature of the conditioned medium;

calculating a target temperature of a conveying medium required to effectuate the heat transfer rate relative to the conditioned medium, the target temperature of the conveying medium being based on the heat transfer rate relative to the condition medium and one or more heat transfer rates acting upon the conditioned medium;

calculating a heat transfer rate relative to the conveying medium in thermal communication with the conditioned medium based on the target temperature of the conveying medium and a dynamically estimated temperature of the conveying medium;

calculating a target temperature of the thermal effector required to effectuate the heat transfer rate relative to the conditioned medium; and controlling the thermal effector to arrive at the target temperature of the thermal effector.

2. The method according to claim 1, wherein the conditioned medium includes a surface or an airstream.

3. The method according to claim 2, wherein the surface is on a vehicle component; and wherein the vehicle component includes a steering wheel, a gear shifter, a seat, a headrest, a door panel, an instrument panel, a headliner, a center console, a leg panel, a floor, or any combination thereof.

4. The method according to claim 2, wherein the airstream emanates from a vent in or on a vehicle component; and wherein the vehicle component includes a steering wheel, a gear shifter, a seat, a headrest, a door panel, an instrument panel, a headliner, a center console, a leg panel, a floor, or any combination thereof.

5. The method according to claim 4, wherein the airstream at an outlet is dynamically estimated.

6. The method according to claim 2, wherein the airstream flows into a containment device in a vehicle component; and wherein the vehicle component includes a steering wheel, a gear shifter, a seat, a headrest, a door panel, an instrument panel, a headliner, a center console, a leg panel, a floor, or any combination thereof.

7. The method according to claim 6, wherein the airstream within the containment device is dynamically estimated.

8. The method according to claim 2, wherein the conveying medium includes a material layer or a heat exchanger.

9. The method according to claim 8, wherein the material layer is a spacer layer.

10. The method according to claim 8, wherein the conditioned medium is the surface; and wherein the one or more other heat transfer rates acting upon the surface include a heat transfer rate between an environment and the surface, a heat transfer rate between an occupant and the surface, or both.

11. The method according to claim 8, wherein the conditioned medium is the airstream; and wherein the one or more other heat transfer rates acting upon the airstream include a heat transfer rate between a conduit through which the airstream travels and the airstream.

12. The method according to claim 1, wherein the thermal effector, which applies the target temperature to the conditioned medium includes a resistance element, a thermoelectric device, or both.

13. The method according to claim 1, wherein controlling the thermal effector to arrive at the target temperature includes regulating power to the thermal effector and/or a speed of a blower to achieve the setpoint temperature.

14. The method according to claim 1, wherein the setpoint temperature is received by a human-machine interface from an occupant.

15. The method according to claim 1, wherein the heat transfer rate relative to the conditioned medium is based on a difference between a temperature applied to the conditioned medium and the dynamically estimated temperature of the conditioned medium, a thermal resistance, and a surface area through which heat transfer occurs.

16. The method according to claim 1, wherein the heat transfer rate relative to the conveying medium is based on a difference between a temperature applied to the conveying medium and the dynamically estimated temperature of the conveying medium, a thermal resistance, and a surface area through which heat transfer occurs.

17. The method according to claim 1, wherein the thermal effector and one or more other thermal effectors cooperate in effectuating the heat transfer rate relative to the conditioned medium.

18. The method according to claim 17, wherein the method comprises:

calculating a total heat transfer rate required from the thermal effector and the one or more other thermal effectors to achieve the setpoint temperature of the conditioned medium; and portioning the total heat transfer rate equally or unequally among the thermal effector and the one or more other thermal effectors.

19. The method according to claim 18, wherein calculating the target temperature of the thermal effector required to effectuate the heat transfer rate relative to the conditioned medium includes calculating a target temperature, respectively, of the one or more other thermal effectors based on each respective portion of the total heat transfer rate attributable to the thermal effector and the one or more other thermal effectors.

* * * * *